Oct. 12, 1948.　　　　C. E. THIESSE　　　　2,451,128
MATERIAL DISTRIBUTOR
Filed July 24, 1945　　　　　　　　　　　　2 Sheets-Sheet 1
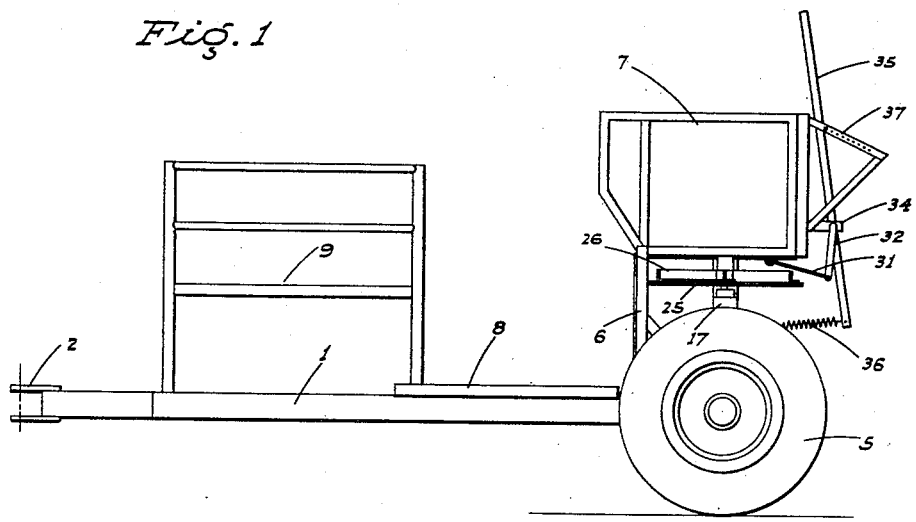
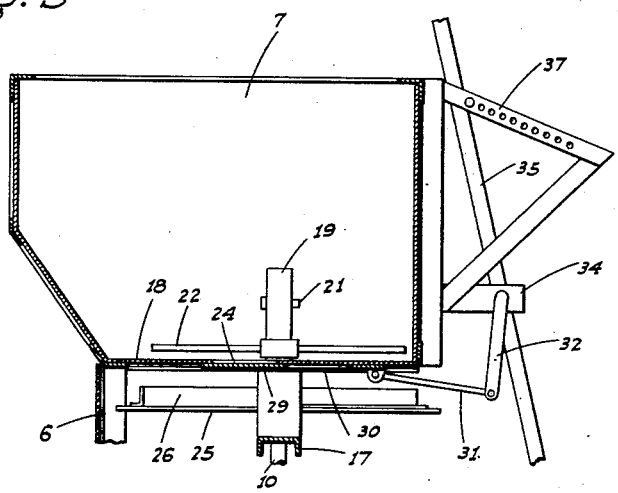
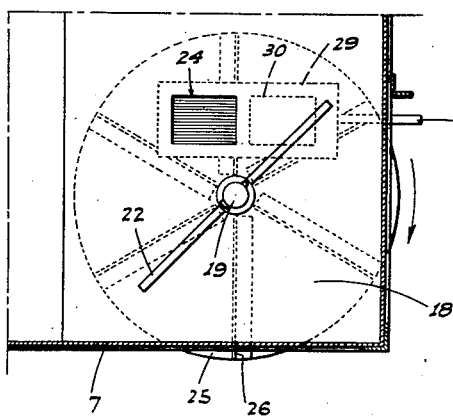
INVENTOR.
Carl E. Thiesse
BY
ATTYS

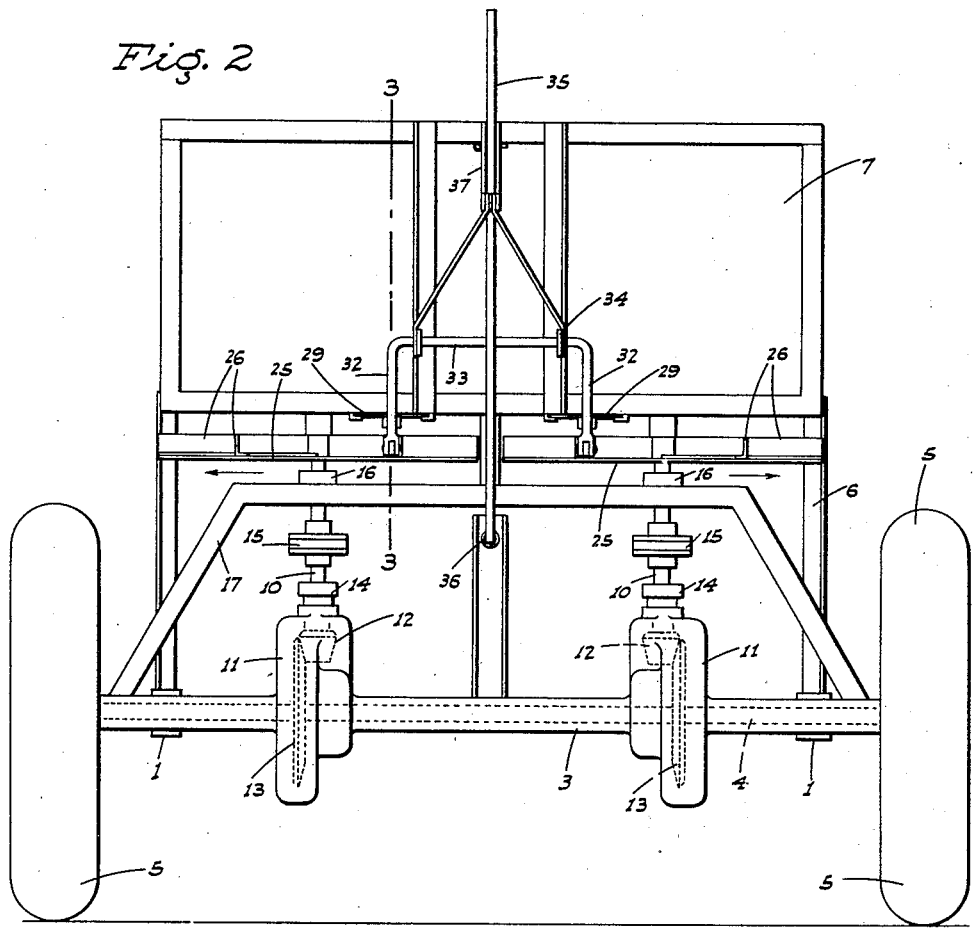

Patented Oct. 12, 1948

2,451,128

UNITED STATES PATENT OFFICE 2,451,128

MATERIAL DISTRIBUTOR

Carl E. Thiesse, Porterville, Calif.

Application July 24, 1945, Serial No. 606,856

4 Claims. (Cl. 275—8).

This invention relates generally to an improved agricultural implement, and in particular is directed to a distributor for materials such as sulphur, gypsum, commercial fertilizer, and the like. The implement is of the rotary discharge type and includes a number of novel features.

One novel feature of the implement is the mounting and drive of the material distributing rotors; such rotors being direct driven from the axle of the implement, but arranged so that they may be uncoupled from the drive for transport of the implement.

A further feature of the invention is the novel assembly, in unitary relation, of each below hopper rotor, the corresponding agitator in the hopper, and a tubular supporting sleeve on which said rotor and agitator are mounted; the sleeve being carried on the upper end of a vertical drive shaft.

Another important feature of the present invention is the assembly of the feed hopper and distributing rotors, which assembly is arranged so that the material is discharged from the implement without obstruction of the flow, and in a plane well above the supporting wheels of the implement.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of the implement.

Figure 2 is an enlarged rear end view of the implement.

Figure 3 is a cross section on line 3—3 of Fig. 2.

Figure 4 is a fragmentary transverse section through the hopper and rotor assembly.

Figure 5 is a fragmentary sectional plan on line 5—5 of Fig. 4.

Referring now more particularly to the characters of reference on the drawings, the implement comprises a horizontal main frame 1 disposed above and for movement along the ground, said main frame including, at its forward end, a hitch 2 adapted for connection with a tractor. At the rear end the main frame 1 includes a horizontal transversely extending axle housing 3 enclosing an axle 4, on opposite ends of which ground engaging wheels 5 are fixed.

An upstanding frame 6 is formed with the main frame 1 ahead of the axle housing 3 and supports a transversely extending hopper 7 which projects rearwardly in vertically spaced overhanging relation to the axle housing 3. An operator's platform 8 is mounted on the main frame 1 ahead of the upstanding frame 6, and a sack supporting rack 9 is carried by said main frame in advance of the platform 8.

The present implement is of two-rotor type and the rotors, together with corresponding agitators, are mounted and driven as follows:

A pair of vertical drive shafts 10 extend upwardly in transversely spaced relation from within gear housings 11 formed in connection with the axle housing 3. Within the gear housings 11 the vertical drive shafts 10 are fitted with pinions 12 which mesh with bevel gears 13 on the axle 4. The power take-off from the axle 4 is thus enclosed within the housings 11 free of dust and dirt; the shafts 10 extending upwardly from said housings 11 through seals 14. For convenience, conventional motor vehicle differential parts may, if desired, be used in connection with the above described power take-off assemblies.

Above the seals 14 the vertical drive shafts 10 have couplings 15 interposed therein and thence extend upwardly in guided relation, as at 16, through an upstanding transversely extending A-frame 17 secured on the axle housing 3.

Above the A-frame each shaft continues upwardly and extends through an opening in the flat bottom 18 of the hopper 7; said shafts terminating within said hopper some distance above the bottom thereof. A sleeve 19, closed at its upper end, is engaged over each shaft 10 from the upper end of the latter, said sleeve being of sufficient length to extend downwardly through the bottom 18 of the hopper 7 to a termination therebelow. A ball bearing 20 is engaged between the upper end of each shaft 10 and the adjacent upper closed end of the corresponding sleeve 19 for the purpose hereinafter described; said sleeve and shaft normally being fixed against relative rotation by means of a cross bolt 21 within the hopper, and thus accessible from the top of the latter.

Within the hopper 7 each sleeve 19 is fitted with a rotary agitator 22 which includes a hub 23 secured to said sleeve. Each agitator 22 is disposed adjacent to the bottom 18 of the hopper and rotates above and in crossing relation to a rectangular hopper opening 24 in said bottom 18.

Below the bottom 18 each sleeve 19 is fitted with a material distributing rotor 25 of horizontal disc-like configuration, and including a plurality of upstanding radially extending, circumferentially spaced vanes 26. Each rotor includes a hub 27 removably secured to the corresponding sleeve 19 by a set screw or the like 28. The rotors 26 are of substantial diameter and extend some distance beyond the corresponding hopper opening 24, whereby said openings deliver onto the rotors 25 intermediate the hub and periphery of said rotors. The rotors 25, as so mounted, are disposed to discharge in a horizontal plane above the top of the wheels 5; said rotors being driven in opposite directions, and as indicated by the arrows in Figs. 2 and 5. The hopper openings 24 deliver onto the rotors 25 laterally inwardly of the shafts 10, and said rotors turn rearwardly and outwardly from the point of reception of material from the openings 24.

The hopper openings 24 are fitted with slide gates 29, each of which includes a port 30 therein adapted to register to a selective extent with the corresponding opening 24, whereby to control the amount of material which flows from the hopper to the rotors.

The gates 29 are simultaneously controlled, and to like extents, by the following mechanism:

Pivotally mounted links 31 extend at a rearward and downward incline from the gates 29 to connection with depending legs 32 formed on opposite ends of a cross rod 33 turnably supported at the back of the hopper 7 by transversely spaced brackets 34. An upstanding control lever 35 is fixed, intermediate its ends, to the cross rod 33, and said lever is urged in a valve opening direction by tension springs 36 which connect between the lower ends of said lever and a forward portion of the frame. Above the cross rod 33 the lever 35 extends upwardly for hand manipulation and is also engaged by an adjustable holding bracket unit 37 by means of which the position of the gates may be adjustably set.

Operation

When the above described implement is in operation it is coupled to a tractor in draft relation, and a supply of sacked material to be distributed is placed on the rack 9.

An operator stands on the platform 8 and with advance of the implement dumps the sacked material into the hopper 7. As the assembly of the agitators 22 and rotors 25 are constantly driven from the wheels 5, as previously described, the material in the hopper 7 is fed downwardly through the openings 24 onto the rotors 25, whence such material is discharged laterally outwardly from opposite sides of the implement, and with considerable force, whereby wide and even distribution is obtained. The implement is especially effective for the distribution of materials such as sulphur, gypsum, commercial fertilizer, and the like.

When it is desired to transport the implement from place to place without operation of the rotors, and at which time material may remain in the hopper 7, the gates 29 are closed, and the agitator-rotor assemblies are disconnected from the shafts 10 by merely withdrawing the cross bolts 21. Thus, when the implement advances the shafts 10 rotate within the sleeves 19, there being little tendency for the latter to rotate due to the provision of the ball bearing 20 between the upper ends of shafts 10 and the closed upper ends of the sleeves.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A material distributing mechanism for an implement which includes a material hopper having a feed opening in the bottom thereof; said mechanism comprising a driven upstanding shaft extending through the bottom of the hopper to one side of said opening, a sleeve surrounding the shaft and extending above and below the bottom of the hopper, a rotary agitator mounted on the sleeve in the hopper, and a material distributing rotor mounted on the sleeve below the hopper and traveling under said feed opening; there being means releasably coupling the sleeve in driving relation to the shaft, the sleeve being closed at its upper end, such end being supported on the upper end of the shaft when the sleeve is released from driving relation with the shaft.

2. A material distributing mechanism for an implement which includes a material hopper having a feed opening in the bottom thereof; said mechanism comprising a driven upstanding shaft extending through the bottom of the hopper to one side of said opening, a sleeve surrounding the shaft and extending above and below the bottom of the hopper, a rotary agitator mounted on the sleeve in the hopper, and a material distributing rotor mounted on the sleeve below the hopper and traveling under said feed opening; the sleeve being closed at its upper end, an antifriction bearing between the upper end of the shaft and the closed upper end of the sleeve, and means releasably coupling the sleeve to the shaft.

3. A material distributor mechanism comprising a frame, an enclosed axle housing at one end of the frame, an axle journaled in the axle housing, ground engaging wheels fixed on the axle, a hopper supported from the frame and overhanging the axle housing, a vertically disposed gear housing secured on the axle housing and opening into the latter, a drive gear fixed on the axle and disposed in the gear housing, a vertical shaft projecting from a point within the gear housing through the top of such housing and into the hopper, a dust seal on the upper end of the gear housing about the vertical shaft, a gear on the vertical shaft within the gear housing and engaged in driving relation with the first named gear, a sleeve releasably connected to the vertical shaft about the upper end thereof, the upper end of the sleeve being closed and such sleeve projecting from a point within the hopper to a point below the hopper, a rotary agitator fixed on the sleeve within the hopper, a distributing rotor fixed to the sleeve below the hopper, and a controlled feed opening in the bottom of the hopper above the distributing rotor.

4. A mechanism as in claim 3 including a vertically disposed A-frame supported from the axle housing, the vertical shaft being journaled through the upper end of said A-frame.

CARL E. THIESSE.

REFERENCES CITED

The following references are of record in the file of this patent:

UNITED STATES PATENTS

| Number | Name | Date |
|---|---|---|
| 15,104 | Luce | June 10, 1856 |
| 1,211,596 | Kindt | Jan. 9, 1917 |
| 1,245,250 | McGee | Nov. 6, 1917 |
| 2,256,655 | Stewart | Sept. 23, 1941 |
| 2,323,262 | Warren | June 29, 1943 |
| 2,327,266 | Hoffstetter | Aug. 17, 1943 |
| 2,334,376 | Bauer | Nov. 16, 1943 |
| 2,340,657 | Goertzen | Feb. 1, 1944 |